(12) United States Patent
Erko et al.

(10) Patent No.: US 6,895,363 B2
(45) Date of Patent: May 17, 2005

(54) INFORMATION MANAGEMENT SYSTEM DEVICE AND METHOD OF USE FOR SURFACE MAINTENANCE VEHICLES AND EQUIPMENT

(75) Inventors: Robert J. Erko, Apple Valley, MN (US); Paul Leonard Groschen, Jr., White Bear Lake, MN (US)

(73) Assignee: Tennant Company, Minneapolis, MN (US)

(*) Notice: Subject to any disclaimer, the term of this patent is extended or adjusted under 35 U.S.C. 154(b) by 192 days.

(21) Appl. No.: 10/274,671

(22) Filed: Oct. 18, 2002

(65) Prior Publication Data

US 2003/0093166 A1 May 15, 2003

Related U.S. Application Data

(60) Provisional application No. 60/337,454, filed on Nov. 9, 2001.

(51) Int. Cl.[7] .............................................. A46B 13/02
(52) U.S. Cl. ...................... 702/183; 702/182; 702/184; 15/88.2
(58) Field of Search ................................ 702/182–184; 15/21.1, 50.1, 53.1, 88.2, 340.3, 319, 320, DIG. 2, 104.94; 134/45, 123, 18, 24, 181, 172, 57 R, 56 R; 118/669, 676, 682

(56) References Cited

U.S. PATENT DOCUMENTS

| | | | |
|---|---|---|---|
| 4,757,566 A | 7/1988 | Field et al. ..................... 15/49 |
| 4,766,432 A | 8/1988 | Field ..................... 340/825.17 |
| 5,086,535 A | * 2/1992 | Grossmeyer et al. ......... 15/319 |
| 5,447,574 A | * 9/1995 | Inoue .......................... 134/18 |
| 5,566,422 A | 10/1996 | Geyer .......................... 15/320 |
| 5,940,928 A | * 8/1999 | Erko ........................... 15/319 |
| 6,151,744 A | * 11/2000 | Ohtani et al. ................ 15/88.2 |
| 6,163,915 A | 12/2000 | Kaczmarz et al. ............ 15/49.1 |
| 2001/0039501 A1 | 11/2001 | Crevel et al. .................. 705/1 |
| 2001/0047214 A1 | 11/2001 | Cocking et al. .............. 700/80 |
| 2001/0053939 A1 | 12/2001 | Crevel .......................... 700/9 |
| 2001/0054038 A1 | 12/2001 | Crevel et al. .................. 707/3 |
| 2002/0175648 A1 | * 11/2002 | Erko et al. .................. 318/560 |
| 2004/0007326 A1 | * 1/2004 | Roche et al. ........... 156/345.24 |

FOREIGN PATENT DOCUMENTS

| | | | |
|---|---|---|---|
| EP | 213394 A1 | 6/2002 |
| EP | 273718 A1 | 1/2003 |
| WO | 01/73215 A1 | 10/2001 |
| WO | 01/73224 A1 | 10/2001 |

OTHER PUBLICATIONS

International Search Report (PCT/US02/34994), dated Feb. 18, 2003.

* cited by examiner

*Primary Examiner*—Carol S. Tsai
(74) *Attorney, Agent, or Firm*—Fulbright & Jaworski L.L.P.

(57) ABSTRACT

A data collection and management method is disclosed for use in association with a surface maintenance machine wherein a control system controls selected machine operations in response to manually inputted operation settings selected by an operator and occurring at selected times. In broad terms, an embodiment of the present invention includes steps of receiving and storing operational and time information associated with machine operation, conveying information to an information processor, and processing the information so as to provide a report or record of time quantified machine information. In a particular application, reports or records can be utilized to provide feedback to a machine operator to improve the cleaning process, such as by minimizing the usage of wear parts, solutions, and or energy.

21 Claims, 6 Drawing Sheets

FIG. 4

Data Management System

Collect
Display

Cancel

FIG. 5

Collect

Point Palm at Control Panel

Status: No Activity

Get Data   Display Data

Cancel

FIG. 6

Display Management System

Thu 3/7/02
Thu 3/7/02

▽ Select Report

Get Report   Cancel

FIG. 7

Display/Daily Summary

Daily Summary

Area Cleaned(sq. ft)   20,000
Total Run Time          5 Hrs
Tank Refills            3
Pad Changes             1

OK

| Display/Machine Summary | | | |
|---|---|---|---|
| Activity | % | Sq. Of Feet | # Time |
| High Travel | 10 | 5000 | 2.1 Hrs |
| Med. Travel | 70 | 11000 | 7.0 Hrs |
| Low Travel | 20 | 7000 | 3.1 Hrs |
| High Scrub | 20 | 1000 | 5 Hrs |
| Low Scrub | 80 | 31000 | 11.0 Hrs |
| High Water | 60 | 21000 | 12.0 Hrs |
| Low Water | 40 | 15000 | 4 Hrs |
| High Burnish | 15 | 1000 | 3.3 Hrs |
| Med. Burnish | 25 | 12000 | 9.4 Hrs |
| Low Burnish | 10 | 3000 | 4.2 Hrs |
| Pad Changes | | | 3  9:15 am |
| Refill | | | 2  8:30 am |
| Battery Ch. | | | 1  11:00 pm |
| | | | OK |

FIG. 8

| Display/Labor Snap Shot | |
|---|---|
| Labor Snap Shot | |
| Area Cleaned (sq. ft.) | 20,000 |
| Productive Time | 3.2 Hrs |
| Idle Time | 1.6 Hrs |
| Score | 67% |
| | OK |

FIG. 9

| Display/Cleaning Details | | | | | |
|---|---|---|---|---|---|
| Date | Start Time | Area Mod | Clean | Min | |
| Mar. 1 | 9:56am | Idl | 0 | 0.1 | |
| Mar. 1 | 9:54am | s | 296 | 1.8 | |
| Mar. 1 | 9:45am | One | 69 | 0.6 | |
| | | | | | OK |

FIG. 10

| Display/Labor productivity | | | |
|---|---|---|---|
| Cleaning | 47% | 58% | 1234 ft/hr |
| Speed | 45% | 75% | 15030 ft/hr |
| Transport | 10% | 50% | 45 min |
| Idle | 31% | 25% | 2.3 Hr |
| Active | 59% | 60% | 4.5 Hr |
| | | | OK |

FIG. 11

INFORMATION MANAGEMENT SYSTEM DEVICE AND METHOD OF USE FOR SURFACE MAINTENANCE VEHICLES AND EQUIPMENT

RELATED APPLICATION

This application claims the benefit of priority pursuant to 35 USC 119 of provisional patent application Ser. No. 60/337,454 filed Nov. 9, 2001, the disclosure of which application is hereby incorporated in its entirety by reference herein.

TECHNICAL FIELD OF THE INVENTION

The term "surface maintenance machine" broadly encompasses vehicles and equipment used for surface maintenance operations such as carpet cleaning, surface scrubbing, burnishing, sweeping, and waxing, artificial turf maintenance, and the like. As used herein floor surfaces include building floors, boat decks, streets, sport fields, and the like. Surface maintenance operations, as used herein further include both flat and non-flat wall surface maintenance operations as well. Additionally, other types of surface maintenance vehicles and equipment may be used in operations such as turf mowing and conditioning. Such equipment may include turf grass cutting or conditioning equipment and the like.

BACKGROUND OF THE INVENTION

Surface maintenance machines are known to sweep an area such as a factory floor, hallway or the like. Also known are machines which will perform a scrubbing function in that same environment. Surface maintenance machines also are designed to perform both scrubbing and sweeping functions. In the latter type of machine there are a number of specific functions that must be controlled in order to do a proper job. Examples of such functions, but not limited are: the sweeping brush must raise and lower, the scrubbing brush must raise and lower; the squeegee must raise and lower to remove used cleaning solution and direct that solution to the recovery tank, the speed and direction of the machine must vary, the filter in the dust collection system must be periodically cleaned, and the debris hopper must be periodically dumped. Not only must the operator and/or machine controller control all of these individual functions, but there are maintenance functions which must be periodically performed on the machine in order to keep it in its most efficient operating condition.

One type of surface maintenance vehicle includes a surface scrubbing machine. An exemplary operator controlled floor surface maintenance vehicle is disclosed in U.S. Pat. No. 5,566,422, incorporated herein by reference, which includes a power source, a surface working implement, and associated fluid sources, such as water and chemical detergent. A controller is included to control various aspects of the machine, for example brush down pressure, machine speed, etc.

A computer controlled surface maintenance machine is disclosed in U.S. Pat. No. 5,940,928, assigned to Tennant Company, and incorporated by reference herein. Disclosed therein is a simplified operator control system for both using the machine in its conventional cleaning task and providing maintenance for the machine at predetermined maintenance levels.

Costs associated with surface maintenance vehicles and equipment include maintenance machine use, use of solvents, chemicals, and the like, wearable tools such as brushes and pads, and, of course, operator time. Since operator labor cost is a significant aspect of the cost associated with the operation of surface maintenance vehicles and equipment, there is a need to minimize labor costs by increasing efficient use of operator time and increasing both operator and machine and material productivity.

A control system for a floor maintenance appliance is disclosed in Tennant Company's U.S. Pat. No. 4,757,566, incorporated by reference herein. Disclosed therein is a circuit for sensing the current load in at least one electric motor and providing a signal representative thereof. There is also a means for manually selecting a desired tool torque to be applied from a plurality of possible tool torques and for providing an electrical signal thereof. The electrical signal representative of the desired tool torque to be applied to the tools and the drive motor load current signal representative of actual tool torque applied to the tools are used to control the actuator for raising and lowering the surface maintenance tools.

Yet another control system for a floor maintenance appliance is disclosed in Tennant Company's copending patent application entitled "Control System for a Floor Maintenance Appliance," Ser. No. 10/153,046, incorporated by reference herein. Also disclosed in the prior art are data loggers or information collection systems for use with vehicles, such as tractor-trailer units or off-the-road equipment. Such systems typically include a device for receiving signals from discrete remote sensors, such as a speed sensor or other activity sensor (limit sensors, load sensors, etc.). The sensors provide feedback to the computer relating to an event or condition. These systems are typically sold as an aftermarket device as a separate discrete system and not otherwise integrated into the control system of the associated device. Additional discrete sensors may be necessary to implement such a system given the unavailability, inaccessibility, or incompatibility of vehicle sensors provided at the time of manufacture. For example, if vehicle speed data were to be collected, an accessory speed sensor may be necessary if the vehicle's speed sensor is inaccessible or incompatible with the data logger.

SUMMARY AND BRIEF DESCRIPTION OF THE INVENTION

It is an object of the present invention to provide a method and system which can be used to provide information which will allow management to improve an industrial or commercial process, particularly as carried out by a surface cleaning machine. In this manner, efficient allocation of materials, energy and/or labor may be promoted by embodiments of the present invention.

In accordance with an exemplary embodiment of the present invention, a data collection and management method is provided for use in association with a surface maintenance machine wherein a control system controls selected machine operations in response to manually inputted operation settings selected by an operator and occurring at selected times. In broad terms, an embodiment of the present invention includes steps of receiving and storing operational and time information associated with machine operation, conveying information to an information processor, and processing the information so as to provide a report or record of time quantified machine information.

In a particular application, reports or records can be utilized to provide feedback to a machine operator to improve the cleaning process, such as by minimizing the usage of wear parts, solutions, and or energy.

In accordance with the present invention, an apparatus and method is disclosed to provide accurate monitoring and reporting of selected aspects of operator, machine and equipment performance. Additionally, machine and equipment material use may be monitored to enhance productivity.

In accordance with another aspect of the present invention, a method and system data is obtained relative to a particular machine pursuant to the present invention, and may be used for subsequent analysis, for example to monitor and manage operator performance, machine performance, material use, and the like. In accordance with the present invention, reports or records may be generated which convey time quantified information relating to operation of the machine. Using the reports or records, operator performance and machine performance may be analyzed for such as variations in brush pressure, travel speeds, fresh solution refills, used fluid dumps, etc. In turn, efficiencies of machine operation may be assessed and operational recommendations may be derived therefrom, and ultimately provide feedback to a machine operator to improve the efficiencies of the surface maintenance process.

DESCRIPTION OF THE FIGURES

FIGS. 4 through 11 illustrate graphical display panels associated with a computer external to a vehicle for use with a method and system according to the present invention.

DETAILED DESCRIPTION OF A PREFERRED EMBODIMENT

In accordance with the present invention, a surface maintenance vehicle and/or surface maintenance equipment is provided with an information collection and management system or tool which is integrated within the controller associated with the surface maintenance vehicle or equipment. In this regard, no separate external data logger or information collection and management system having discrete sensors is necessary. Importantly, discrete sensors are not required to practice a system according to the present invention. Rather than relying on sensors, the information collection and management system utilizes information derived from a user's manual selection of machine operation. For example, rather than relying on a sensor to determine brush down pressure, etc., a system according to the present invention would derive information associated with a user's brush down pressure selection, e.g., light, medium, or heavy. In this regard, a less expensive and less complex information collection and management system is provided. Overall robustness of an information collection and management system of the present invention results from the ability to rely on intended condition levels rather than sensor measured conditions.

The method of system according to the present invention will be described through reference to an embodiment of the system of the invention as used by way of example for monitoring a floor cleaning machine. However, it will be appreciated that the method and system of the present invention may be utilized in other surface cleaning or maintenance equipment or other vehicles or devices such as turf maintenance equipment, utility loaders or other mechanized construction or earth moving equipment.

Figure 1:
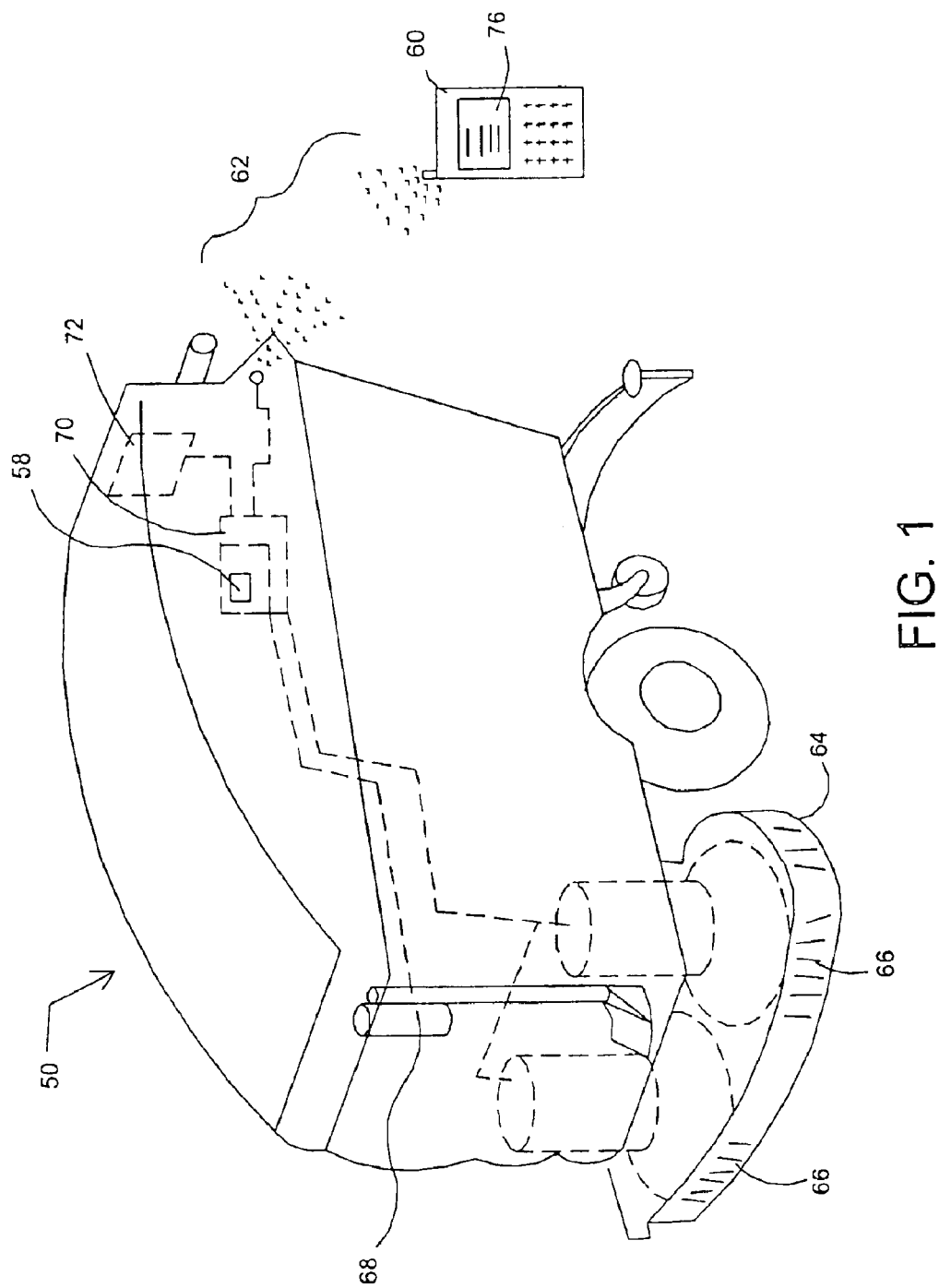
FIG. 1 is perspective diagrammatic view of a multifunction cleaning machine for use with a system and method of use of the present invention.
Figure 2:
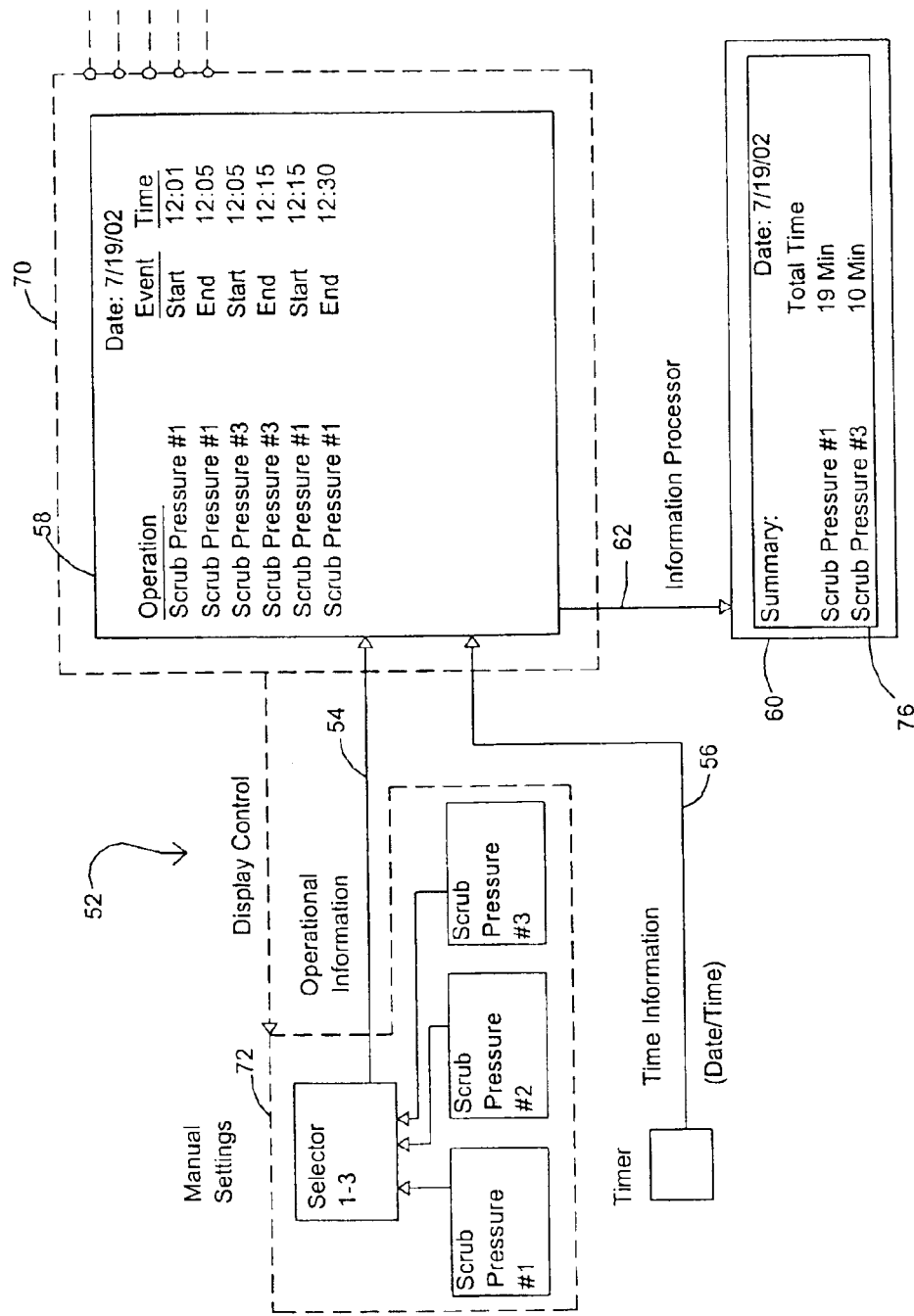
FIG. 2 is a block diagram of one embodiment of a system of the present invention.

Referring to FIGS. 1 and 2, a surface maintenance machine 50 is provided with an information collection and management system 52 according to the present invention.

In accordance with the present invention, selected operational information 54 and time information 56 is transferred to a storage device 58 on surface maintenance machine 50 and subsequently transferred to an information processor 60 via a communications link 62. As described in more detail hereinafter, operational information 54 is derived from machine settings which are manually input by an operator during machine 50 use.

In accordance with one aspect of the present invention, machine 50 information 54, 56 is accumulated and shared with other information management tools. In one embodiment, collected information is transferred to a secondary data processor (such as a desktop computer, etc.) via an intermediate direct coupled or wireless communications device, such as, among others, a personal digital assistant (PDA), including for example a PALM PILOT PDA device, or other third party data management or other data processing tools and devices (e.g., Hand Spring PDA, Windows CE or PC based data processing systems). Intermediate steps of the data transfer may occur via direct or indirect coupling between the handheld device and the secondary processor, e.g., a handheld cradle operation via a PDA cradle/port device, an additional wireless communication via a wireless device, or via the internet/email via a modem. Alternative data transfer devices, systems, or techniques may be appreciated by those skilled in the relevant arts. In another embodiment, collected information is transferred to a data processor such as a PALM PILOT PDA device for immediate reporting on machine parameters.

In the illustrated example, machine 50 includes a scrubber unit 64 having a scrubbing medium, here a pair of disk brushes 66, for engaging the ground surface. Disk brush 66 pressure is related to the position of linear actuator 68 and may be controlled by adjusting the linear actuator 68 via an electronic control device 70.

Machine 50 includes control device 70 and communication system 62, each of which may be comprised of one or more discrete electronic elements, such as FPGA's, or other programmable digital control systems, communication modules, antennas, memory devices, etc. Control device 70 may include components separated in space from each other on machine 50. Control device 70 may control the operation of one or more systems of machine, such as scrubber unit 64. For example, control device 70 may control the brush pressure (related to brush torque) of scrubber 64. One particular approach to controlling brush torque is disclosed in U.S. Pat. No. 4,757,566, entitled "Control of Torque in Floor Maintenance Tools by Drive Motor Load", incorporated in its entirety by reference herein. Control device 70 includes a user interface such as user interface 72 wherein a user may manually select machine operations by providing manually inputted settings at occurring selected times and selected through the input control interface. Other user interfaces would be appreciated by those of ordinary skill in the art and may include switches, buttons, touch sensitive devices, voice activated devices, etc.

FIG. 2 is a simplified block diagram representation of one embodiment of system 52. Operational information 54 derived from the manually selected settings on user interface 72 is communicated to storage device 58. An operator may manually select different operations during a cleaning period through user interface 72. For example, the operator may manually select operation at a first scrub pressure for a given period of time and then change to a different scrub pressure for another period of time. Additionally, time information 72 in the form of time and date information is communicated to storage device 58. Storage device 58 may store the operational information 54 and time information 72 in a table or "snap-shot" format. The operational information 54 and time information 72 may be selectively communicated to information processor 60, such as an external portable computer, PDA, etc, via communications system 62. In the diagram of FIG. 2, operational information 54 relating to scrub pressure is derived from manually selected user input at user interface 72. Time information 56 includes the date and time of an event. Storage device 58 may store START and STOP events associated with changes in operational information. Information processor 60 may provide a record 76 of time quantified machine operational information. In the diagram of FIG. 2, record 76 may include total operation times at different scrub pressures. Additional records may be provided, such as solution distribution levels, travel speeds, etc. Record format 76 may vary depending on the particular functions of a machine. Record format 76 may also be customized by a user to provide for a particular format. Records 76 may be stored on information processor 60 or may be communicated to another information processor. Multiple records 76 may be compared and analyzed to optimize a surface cleaning process. For example, comparisons between a well cleaned floor and a poorly cleaned floor may be made by reviewing the machine 50 records 76 of information relating to machine 50 use. For further example, a manager may review records 76 associated with two different operators using a machine at a given location to compare performances of the two operators and then to educate one or more of the operators on machine usage toward improving the overall cleaning of a floor surface.

Time information 56 may include time and/or date information. Operational information 54 is derived from a manual setting and not determined from a sensor. The manual setting may be inputted by the operator via a user interface 72, such as a touch sensitive screen or other switches. For example, operational information may include setting number such as scrub level # 1—Heavy, or scrub level #2—Medium, or scrub level # 3,—Light. Other operational information may include burnishing level, machine travel speed level, solution usage level, etc.

System 52 may include one or more sensors (not shown) to be used in conjunction with operational information derived from one or more manual settings. Such sensors may include a speed sensor, a limit switch, etc.

Storage unit 58 may store operational information 54 and time information 56 in snap-shot format wherein information is recorded upon a change of conditions. For example, operational information 54 and time information 56 may be stored only upon changes in a condition, such as a change in scrub pressure, travel speed, burnishing level, etc. In this manner, only relevant operational information 54 and time information 56 is recorded. Referring again to FIG. 2, the total time at a particular operation can be calculated with knowledge of START and STOP times associated with that particular operation. For example, the total time at a scrub pressure level #1 is calculated with knowledge of the start and stop times of each scrub pressure level # 1 operation, e.g., 12:05–12:01 (4 minutes) and 12:30–12:15 (15 minutes) for a total of 19 minutes of operation at torque level #1. Alternative approaches to storing the operational information 54 and time information 56 would be appreciated by those skilled in the relevant arts.

As described, data collection and management system 52 includes a data storage component 58. Data collection and management system 52 is different from prior art data loggers in that few, if any discrete sensors are utilized to provide information to the system 52 regarding a particular component or operation. For example, when a change from a high brush down pressure to a low brush down pressure occurs in response to a user setting input at user interface 72, the data collection and management system 52 derives that information from the manual setting, i.e., a change of down pressure has occurred, and stores that information without directly sensing the down pressure such as through a force sensor or load current sensor. In another example, information relating to the number of burnish pad changes may be collected by noting the user's selection of a "pad change" at the user interface 72, and not via limit switches or other sensors which could also convey the information. Data storage component 58 is illustrated in FIG. 1 to be in close association with control device 70. In other embodiments data storage component 58 may be positioned away from control device 70.

In embodiments of the present invention, communication would be provided between elements of control device 70 and the management system 52. In essence, the data collection and management system 52 would be "internally informed" by control device 70 that a change in conditions has occurred (or at least is intended), rather than relying on an external discrete sensor to determine a condition change. Obviously, the information conveyed directly to data collection and management system 52 would relate to an intended condition, and may not necessarily represent an actual condition such as would be conveyed via a discrete sensor. However, by providing intended condition levels instead of actual condition levels (as through a sensor), a reduction in the complexity and cost of a data collection system is achieved. Significant costs savings and efficiencies result from having operational information derived from the machine settings and not signals from a sensor external to the control device 70.

Data collection and management system 52 according to the present invention may be implemented with relatively few discrete sensors. Examples of parameters which can be passively sensed include machine travel speed (high, medium, low), scrub pressures (high, medium, low), and burnish pressures (high, medium, low). Additionally, cumulative information may be determined through reference to the stored data, including for example, time of machine use at high, medium, and low travel speeds, time of machine use with scrub or burnish pressures at high, medium, and low pressures. In an alternative embodiment, one or more sensors may provide sensor information to be utilized by the system 52.

Communication system 62 may convey machine information to an information processor 60 such as a personal digital assistant (PDA). Alternatively or additionally, communication system may convey information to a laptop computer having wireless or direct communications capability to directly collect information from the machine. In a preferred embodiment, communication system 62 includes an IR transceiver for receiving and transmitting information between system 52 and information processor 60.

In yet another alternative embodiment, information from the machine may be conveyed via wireless communications, such via cellular, PCS, CDMA, and GSM networks.

Software may process information received from the machine and yield the derived information listed above and additional information regarding machine and operator performance and productivity. Additional information may include cost data, such as machine, operator labor, chemical, and wear component costs. More accurate accounting may be provided with reference to such information. Output of the information may be via known information displays, such as graphs, reports, etc. Reports may be generated to be used to focus attention on operator performance characteristics to identify particular "best modes" of machine operation. One or more machines may be accessed to provide comparison via a single computing device. In this regard, a manager may poll one or more machines and perform operator comparisons, etc.

Figure 3:
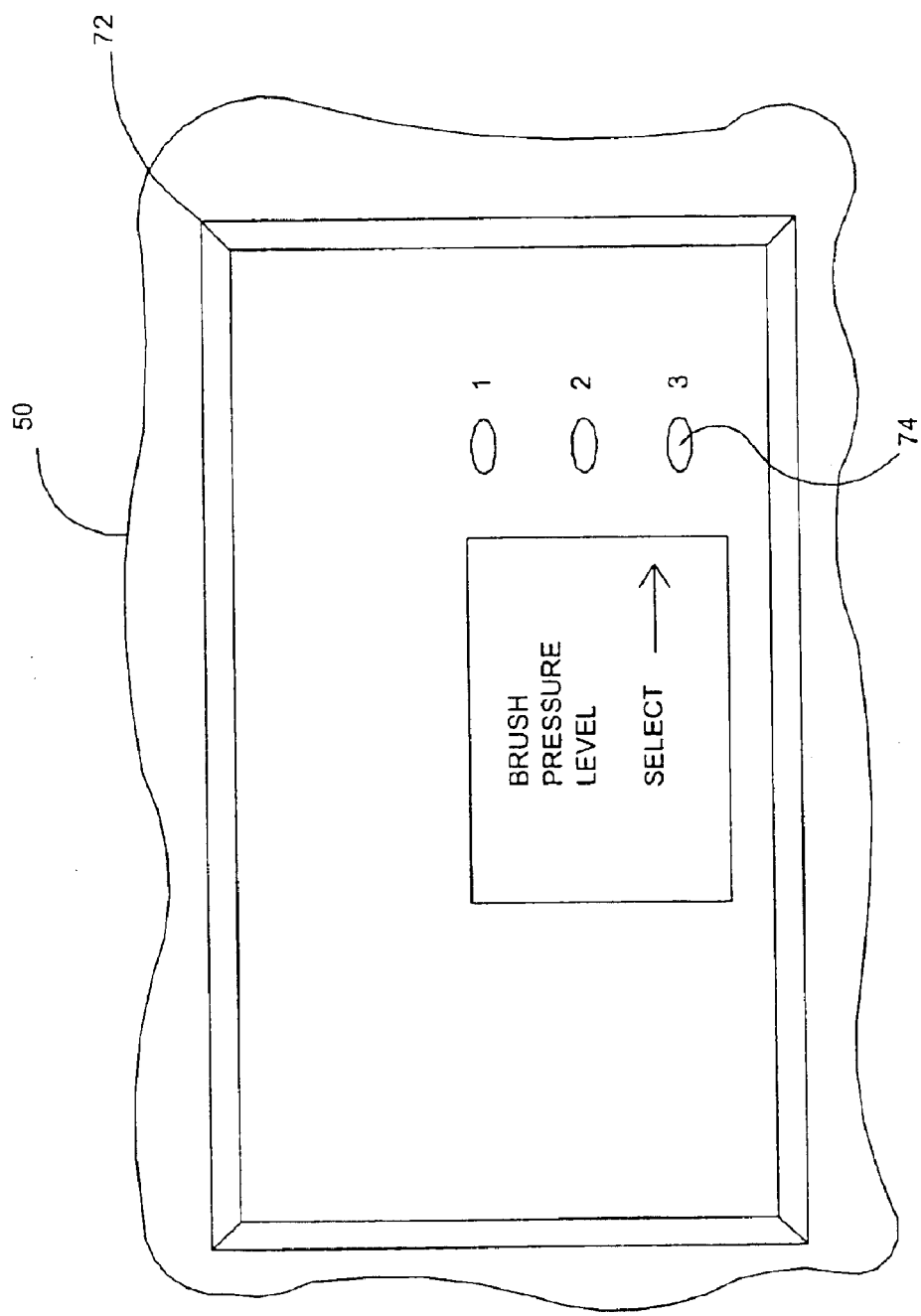
FIG. 3 is a illustration of a control panel for use in a particular embodiment of the present invention.

FIG. 3 illustrates one example of a user interface 72, a control panel having selections for scrub pressure. User interface 72 may be a touch sensitive LCD panel presenting different screens for operator consideration. In operation, the user is able to change to different scrub pressure levels via buttons 74. For example, if a different level of operation is desired, the user may actuate buttons 74 to increase or decrease the level. The user is able to manually select from a plurality of discrete operational levels associated with a given tool or condition. During a cleaning period, the user may select different settings via user interface 72 to adjust the machine to different floor conditions, etc. For example, with regard to scrubber 52 operation, the user may select through user interface 72 a level of 1, 2, or 3 associated with a low, medium, or high scrub pressure, operate the machine for a period of time at a given level, and then change to a different level of scrub pressure. In another example (not shown), with regard to down pressure on a burnishing machine, the user may select a burnish level of 1, 2, or 3 associated with low, medium, or high burnish down pressure. The three levels are for example only as a system according to the present invention may have more than 3 selections associated with any given tool operation or condition.

FIGS. 4 through 11 illustrate one embodiment of information displays provided in association with a cleaning machine 50 having a scrubbing operation. The information may be displayed upon a information processor 60, such as a PDA, for in-field machine analysis.

FIG. 4 represents an initial display, having Collect and Display selections. FIG. 5 represents the display upon selecting the Collect selection of FIG. 4. FIG. 6 represents the display upon selecting the Display selection of FIG. 4. FIG. 7 is a Daily Summary report indicating the area cleaned, total run time in hours, tank refills, and pad changes. FIG. 8 illustrates Machine Summary information such as travel speeds, water usage, and brush pressures. Particular values may be estimations as the calculations rely on intended values and not values received via sensor. FIGS. 9 through 11 illustrate additional report screens associated with a multifunction cleaning machine. A cleaning process may be improved via implementation of the present invention, for example through a review and efficient allocation of labor, efficient usage of solutions or wear products, and efficient usage of energy (particularly for battery powered machines). Managers may improve productivity by reviewing various records 76, such as indicated in FIGS. 4 through 11, and directing operators to perform in a particular manner depending on the cleaning task and other conditions. For example, an operator may be directed to decrease the scrub pressure and/or increase the travel speed in order to decrease the time and energy requirements necessary to clean a give floor surface. Other feedback to the operator utilizing records 76 would be readily appreciated by those of ordinary skill in the arts.

An additional aspect of the information system according to the present invention includes the ability to obtain or derive operation information from other third party devices or systems for floor maintenance machine management. Such third party systems may include CAN bus (controller area network bus) having data thereon in accordance with, among others, standardized industrial protocol for distributed intelligence which also may include multi-processors and/or a multi master. Other such third party systems may include other defined industrial protocols for example SAEJ1708 and SAEJ1939 and the like.

Figure 12:
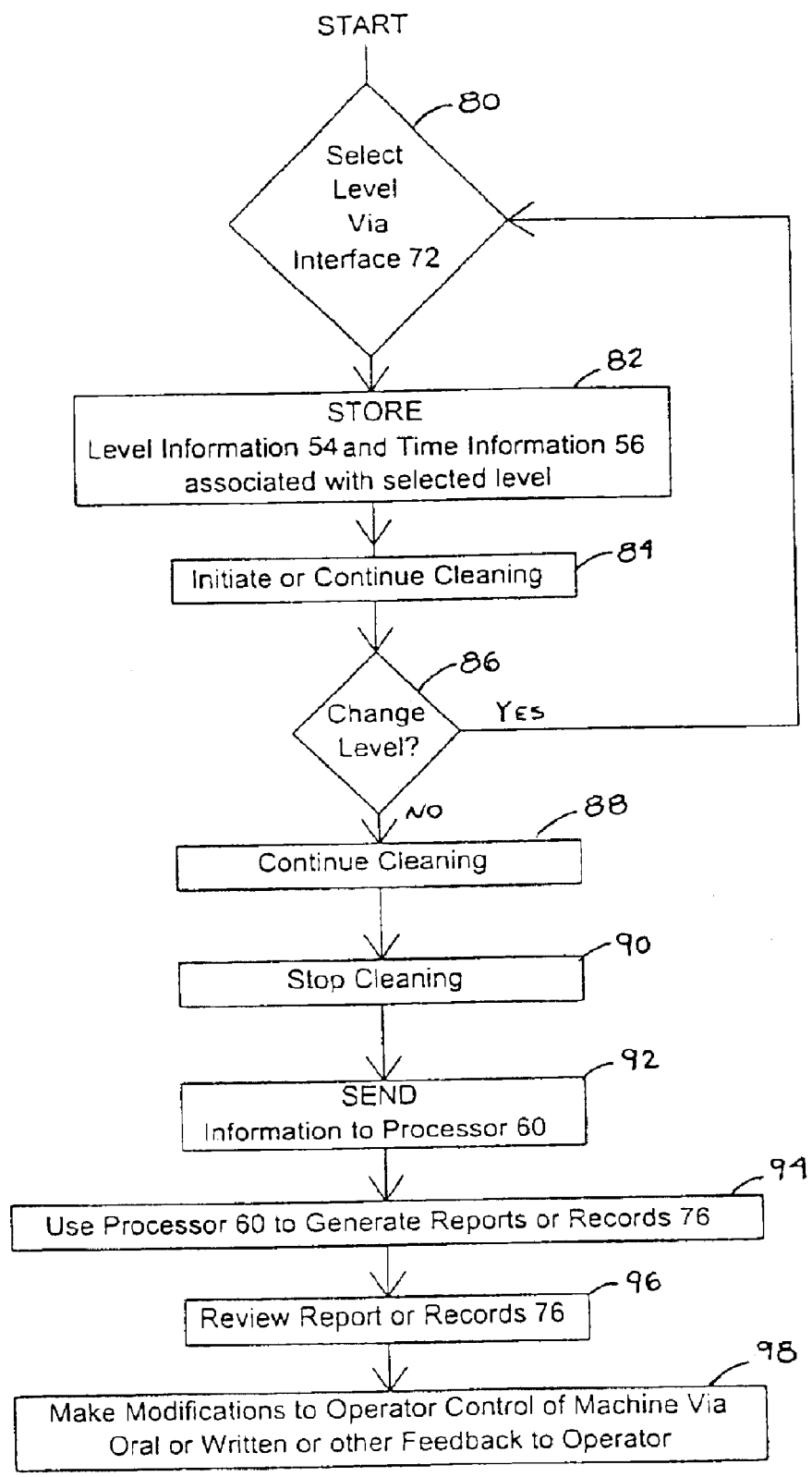
FIG. 12 is a block diagram illustrating an embodiment of the present invention.

FIG. 12 is a block diagram illustrating an embodiment of the present invention. After start-up and during machine operation, initial states and changes to machine parameters, such as scrub pressure, travel speed, etc. which are manually selected by the operator via interface 72, are indicated as block 80. Operational information 54 and time information 56 associated with selected level(s) are stored as block 82. Block 84 represents initiation or continuation of a cleaning task. Block 86 represents a decision block. If changes to the machine operation are made via manual selection by the operator, the functions of blocks 80, 82, and 84 are repeated. In this manner, during operation of the machine multiple cycles through steps 80, 82, 84, and 86 may take place. With each cycle operational information 54 and time information 56 are stored in storage unit 58. Again, FIG. 2 illustrates one format of information 54, 56 storage in a snap-shot table format. Block 88 represents continuation of the cleaning task until completion or machine stoppage at block 90. After machine stoppage or completion of a cleaning task, information 54, 56 is conveyed to information processor 60 via communication system 62 as indicated in block 92. Reports or other records 76 may be generated by information processor 60 or other information processor as indicated in block 94. An operator, manager or another may review the contents of record 76 as indicated in block 96. Decisions as to future machine operation and/or evaluations of past machine performance may be made with reference to records 76. For example, an operator may be directed to decrease the scrub pressure from a maximum scrub pressure so as to economize usage of the scrub brush or other wear parts. In another example, an operator may be directed to decrease the burnish pressure of a burnisher unit to economize energy usage. This process describes a "feedback" loop wherein the operator performs a cleaning task, a manager or another reviews information associated with the cleaning task, and the provides direction or feedback to the operator so that the operator may make future adjustments to the machine to improve cleaning productivity or efficiency. In this regard, an improved cleaning process may be facilitated by an embodiment of the present invention. Machine usage and operator control of the machine may be efficiently and economically monitored by implement of the present invention and operators may then be directed to perform in a particular manner to improve a cleaning process.

Other surface cleaning or maintenance equipment or other vehicles or devices such as turf maintenance equipment, utility loaders or other mechanized construction or earth moving equipment may benefit from implementation of the present invention. In this regard, managers or others of such equipment may monitor and provide feedback to machine operators to improve efficiency and/or productivity of the associated task.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims.

We claim:

1. A data collection and management method for use in association with a surface maintenance machine for providing a surface maintenance operation, wherein a machine control system controls selected machine operations in response to manually inputted settings occurring at selected times and selected through an input control interface, said method comprising the steps of:

storing operational information derived from the settings;

storing time information associated with said manually inputted settings;

conveying the operational information and the stored time information to an information processor;

processing the operational information and the stored time information by way of said information processor so as to provide a record of time quantified machine operational information associated with said selected machine operations occurring at selected times; and analyzing the record of time quantified machine operational information to improve a floor cleaning process.

2. The method of claim 1 wherein:

the machine includes a scrubbing medium, and the selected operational information is related to scrub pressure of the scrubbing medium.

3. The method of claim 2 wherein the selected operational information is associated with a selected level of scrub pressure.

4. The method of claim 1 wherein the step of conveying includes the step of conveying the operational information and stored time information via a communication system to an information processor external to the machine.

5. The method of claim 1 further comprising the step of analyzing the record of time quantified machine operational information so that efficiencies of machine operation may be assessed and operational recommendations may be derived therefrom.

6. The method of claim 1 further comprising the step of storing sensor information from at least one sensor on the surface maintenance machine.

7. The method of claim 6, wherein the step of conveying information includes conveying said sensor information, and wherein said method includes the step of analyzing the record of time quantified machine operational information and said sensor information, so that efficiencies of machine operation may be assessed and operational recommendations may be derived therefrom.

8. A data collection and management system for use in association with a surface maintenance machine for providing a surface maintenance operation, wherein a machine control system controls selected machine operations in response to manually inputted operation settings occurring at selected times and selected through an input control interface, said data collection and management system comprising:

a memory device for storing operational information derived from said operation settings, and time information associated selected times;

a communications system for conveying said operational information and said time information to an information processor, said information processor operative for providing a record of time quantified machine operational information; and a report for analyzing the record of time quantified machine operational information to improve a floor cleaning process.

9. The system of claim 8 wherein the surface maintenance appliance is a scrubber and the plurality of predetermined operational parameters are relating to scrub pressure.

10. The system of claim 9 wherein the information processor is external to the machine.

11. The system of claim 9 further comprising: at least one sensor for sensing a machine parameter, and said communications system additionally conveying sensor information to the information processor.

12. The system of claim 9 wherein the information processor is a portable computer capable of processing and display of information.

13. The system of claim 12 wherein the communications system includes an infrared transceiver for receiving and transmitting information between the portable computer and the machine.

14. A data collection and management method for use in association with a surface maintenance machine for providing a surface maintenance operation wherein a machine control system controls selected machine operations in response to manually inputted operation settings occurring at selected times and selected through an input control interface, said data collection and management system, said method comprising the steps of:

storing operational information upon a change from a first machine operation to a second machine operation in response to a manually selected setting;

storing time information associated with said change occurring at said selected times;

conveying the operational information and time information to an information processor;

processing the operational information and time information by way of said information processor so as to provide a record of time quantified machine operational information; and analyzing the record of time quantified machine operational information to improve a floor cleaning process.

15. The method of claim 14 wherein:

the machine includes a scrubbing medium, and the selected operational information is related to scrub pressure associated with the scrubbing medium.

16. The method of claim 15 wherein the selected operational information is associated with a selected level of scrub pressure.

17. The method of claim 14 wherein the step of conveying includes the step of conveying operational information and time information via a communication system to an information processor external to the machine.

18. The method of claim 14 further comprising the step of storing sensor information from a sensor on the surface maintenance machine.

19. The method of claim 18 further comprising the step of utilizing sensor information with the operational information and time information by way of said information processor.

20. A data collection and management tool for use in association with a surface maintenance machine for providing a surface maintenance operation wherein a machine control system controls selected machine operations in response to manually inputted operation settings occurring at selected times and selected through an input control interface, said data collection and management system, said tool comprising the steps of:

means for storing operational information derived from the settings;

means for storing time information associated with said selected machine operations associated with said settings;

means for conveying the operational information and time information to an information processor;

means for processing the operational information and time information by way of said information processor so as to provide a record of time quantified machine operational information; and means for a providing a report for analyzing the record of time quantified machine operational information to improve a floor cleaning process.

21. A data collection and management tool of claim 20 wherein the means for conveying is selectively controlled.

* * * * *